United States Patent
Jagyasi et al.

(10) Patent No.: US 12,468,982 B2
(45) Date of Patent: Nov. 11, 2025

(54) ADAPTIVE AND EVOLUTIONARY FEDERATED LEARNING SYSTEM

(71) Applicant: Accenture Global Solutions Limited, Dublin (IE)

(72) Inventors: Bhushan Gurmukhdas Jagyasi, Maharashtra (IN); Siva Rama Sarma Theerthala, Secunderaba (IN); Saurabh Pashine, Madhya Pradesh (IN); Soumit Bhowmick, Kolkata (IN); Gopali Raval Contractor, Maharashtra (IN)

(73) Assignee: Accenture Global Solutions Limited, Dublin (IE)

( * ) Notice: Subject to any disclaimer, the term of this patent is extended or adjusted under 35 U.S.C. 154(b) by 943 days.

(21) Appl. No.: 17/671,092

(22) Filed: Feb. 14, 2022

(65) Prior Publication Data
US 2023/0259812 A1    Aug. 17, 2023

(51) Int. Cl.
G06N 20/00    (2019.01)
G06N 3/126    (2023.01)

(52) U.S. Cl.
CPC ............. *G06N 20/00* (2019.01); *G06N 3/126* (2013.01)

(58) Field of Classification Search
CPC ........... G06N 20/00; G06N 3/126; G06N 3/12
USPC ...................................... 706/12, 13
See application file for complete search history.

(56) References Cited

U.S. PATENT DOCUMENTS

| | | | |
|---|---|---|---|
| 2007/0208677 A1* | 9/2007 | Goldberg | G06N 3/126 706/13 |
| 2021/0042628 A1 | 2/2021 | Zhou et al. | |
| 2021/0067339 A1 | 3/2021 | Schiatti et al. | |
| 2021/0374617 A1* | 12/2021 | Chu | G06N 20/20 |
| 2022/0344049 A1* | 10/2022 | Hall | G06F 9/5066 |
| 2023/0068386 A1* | 3/2023 | Akdeniz | G06N 3/084 |
| 2023/0177349 A1* | 6/2023 | Balakrishnan | H04L 67/10 706/25 |

FOREIGN PATENT DOCUMENTS

WO    WO 2021/247448 A1    12/2021

OTHER PUBLICATIONS

Al-Saedi et al., "Reducing Communication Overhead of Federated Learning through Clustering Analysis", 2021 IEEE Symposium on Computers and Communications (ISCC), Sept 5, 2021, pp. 1-7. (Year: 2021).*

(Continued)

*Primary Examiner* — Hwei-Min Lu
(74) *Attorney, Agent, or Firm* — Polsinelli PC (57) ABSTRACT

This application discloses a system and method for federated collaborative machine learning model development using local training datasets that are not shared. An adaptive and evolutionary approach is used to select local training nodes that are most fit from one training round to the next training round to optimize an overall cost and performance function for the federated learning, to cross-over model architecture between local training nodes, and to perform model architecture mutation within local training nodes. The local training nodes are further clustered to account for the inhomogeneity in the local datasets. Such adaptive, evolutionary, and collaborative federated learning thus provides cost-effective and high-performance model development.

20 Claims, 8 Drawing Sheets

(56) References Cited

OTHER PUBLICATIONS

Zhu et al., "Multi-objective Evolutionary Federated Learning", ARXIV ID: 1812.07478, published on Dec. 18, 2018, pp. 1-12. (Year: 2018).*
Liu et al., "Deep Anomaly Detection for Time-series Data in Industrial IoT: A Communication-Efficient On-device Federated Learning Approach", ARXIV ID: 2007.09712, published on Jul. 19, 2020, pp. 1-11. (Year: 2020).*
Yeo et al., "Crossover-SGD: A gossip-based communication in distributed deep learning for alleviating large mini-batch problem and enhancing scalability", ARXIV ID: 2012.15198, published on Dec. 20, 2020, pp. 1-14. (Year: 2020).*
Hadjiivanov et al., "Epigenetic evolution of deep convolutional models ", ARXIV ID: 2104.05411, Apr. 12, 2021, pp. 1-9. (Year: 2021).*
Li et al., "Evolutionary-based Federated Ensemble Learning on Face Recognition", 2021 IEEE 4th Advanced Information Management, Communicates, Electronic and Automation Control Conference (IMCEC), vol. 4, Jun. 2021, pp. 815-819. (Year: 2021).*
Zhu et al., "Real-Time Federated Evolutionary Neural Architecture Search", IEEE Transactions on Evolutionary Computation, vol. 26, No. 2, Jul. 26, 2021, pp. 364-378. (Year: 2021).*
Al-Saedi et al., "Reducing Communication Overhead of Federated Learning through Clustering Analysis", 2021 IEEE Symposium on Computers and Communications (ISCC), Sep. 5, 2021, pp. 1-7. (Year: 2021).*
He et al., "Short-Term Residential Load Forecasting Based on Federated Learning and Load Clustering", 2021 IEEE International Conference on Communications, Control, and Computing Technologies for Smart Grids (SmartGridComm), Oct. 2021, pp. 77-82. ( Year: 2021).*
Agrawal et al., "Genetic CFL: Hyperparameter Optimization in Clustered Federated Learning", Computational Intelligence and Neuroscience, vol. 2021, Article ID 7156420, published on Nov. 18, 2021, pp. 1-10. (Year: 2021).*
Nie et al., "Cross-Domain Recommendation via User-Clustering and Multidimensional Information Fusion", IEEE Transactions on Multimedia, vol. 25, date of publication: Dec. 9, 2021, pp. 868-880. (Year: 2021).*
Agrawal, Shaashwat et al., "Genetic CFL: Hyperparameter Optimization in Clustered Federated Learning", Hindawi Computational Intelligence and Neuroscience, vol. 2021, Article ID 7156420; Nov. 18, 2021; 10 pages.
Beutel, Daniel J ., et al. "Flower: A friendly federated learning framework." arXiv preprint arXiv:2007.14390 (2020).
Bonawitz, Keith, et al. "Towards federated learning at scale: System design." arXiv preprint arXiv:1902.01046 (2019).
Kholod, Ivan, et al. "Open-Source Federated Learning Frameworks for IoT: A Comparative Review and Analysis." Sensors 21.1 (2021): 167.
Li, Qinbin, et al. "A survey on federated learning systems: Vision, hype and reality for data privacy and protection." arXiV preprint arXiv:1907.09693 (2019).
Lo, Sin Kit, et al. "Architectural Pattenls for the Design of Federated Learning Systems." arXiV preprint arXiv:2101.02373 (2021).
Lo, Sin Kit, et al. "A systematic literature review on federated machine learning: From a software engineering perspective." *ACM Comguting Surveys(CSUR)* 54.5 (2021): 1-39.
Wang, Guan, Charlie Xiaoqian Dang, and Ziye Zhou. "Measure contribution of participants in federated learning." 2019 IEEE International Conference on Big Data (Big Data). IEEE, 2019.
Zhu, Hangyu et al.; "Mum-objective Evolutionary Federated Learning"; arXiv:1812.07478V2 [cs.LG]; Jun. 8, 2019; 13 pages.
Extended European Search Report issued on EP23151496.9 on Jun. 26, 2023, 8 pages.

* cited by examiner

ADAPTIVE AND EVOLUTIONARY FEDERATED LEARNING SYSTEM

BACKGROUND

Technical Field

This application relates to a computer system and method for optimizing performance and cost in training and developing artificial intelligence models via federated learning.

Background Technologies

In many circumstances involving artificial intelligence applications, a predictive global machine learning model may be developed by a collection of parties. Datasets used for training such a global model may be distributed among the parties. In some situations, their datasets may be too sensitive for sharing during the training of the model. As such, it may be desirable to develop a system that incentivizes/encourages the parties to participate in a collaborative process by locally training the global model using high quality local training datasets without sharing the datasets, and that minimizes communication cost and optimizes the model architecture and performance during the collaborative training.

BRIEF SUMMARY

The disclosure below is directed to a computer system and method for optimizing performance and cost in training and developing artificial intelligence models via federated collaborative machine learning. The disclosed system and method employ an evolutionary approach to federated learning by intelligently selecting, crossing over, and mutating representative local training nodes to optimize model architecture and performance, and to minimize training inefficiencies and cost for the artificial intelligence model.

In some example implementations, a system for adaptive and evolutionary federated learning is disclosed. The system may include a memory circuitry for storing computer instructions, a network interface circuitry; and a processor circuitry in communication with the network interface circuitry and the memory circuitry. The processor may be configured to execute the computer instructions to receive sharable data from a plurality of local computation nodes; cluster the plurality of local computation nodes into a plurality of clusters based on a set of clustering features extracted from the sharable data; and select a subset of local computation nodes from the plurality of local computation nodes as representatives of the plurality of clusters to participate in a collaborative machine learning. The processor circuitry may be further configured to iteratively provision the collaborative machine learning by the subset of the local computation nodes until a termination condition is met by: receipt, from the subset of local computation node, sets of model hyper parameters and sets of model metrics associated with machine learning models trained at the subset of local computation nodes using non-sharable datasets of the subset of local computation nodes; performance of at least one model hyper parameter cross-over of the machine learning models among the subset of local computation nodes to update the sets of model hyper parameters for the subset of local computing nodes; elimination of selected local computation nodes of the subset of local computation nodes to obtain a remaining subset of local computation nodes using a multi-dimensional cost/performance function; and instruction of the remaining subset of local computation nodes to perform a next round of training using the non-sharable datasets based on the updated sets of model hyper parameters.

DETAILED DESCRIPTION

This system will now be described in detail hereinafter with reference to the accompanied drawings, which form a part of the present disclosure, and which show, by way of illustration, examples of embodiments. The system may, however, be embodied in a variety of different forms and, therefore, the disclosure is intended to be construed as not being limited to the embodiments set forth. Further, the disclosure may be embodied as methods, devices, components, or systems. Accordingly, embodiments of the disclosure may, for example, take the form of hardware, software, firmware or any combination thereof.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for the existence of additional factors not necessarily expressly described, again, depending at least in part on context.

This disclosure generally relates to machine learning and deep learning. Classical machine learning and deep learning algorithms require sufficient training datasets for extracting data features to obtain a model with fair performance. In many circumstances, the demanded datasets for training the model are large in scale and may be distributed in multiple sources which are laborious to access from a centralized model training server or server group. Centralized model training thus may incur excessively burdensome computing and network requirements and other inefficiencies associated with movement of data from the distributed sources to the central server. Furthermore, in some circumstances, these data sources may be private and associated with various security restrictions. For example, their access may be limited/restricted by General Data Protection Regulation (GDPR). As such, centralized model training may not be possible unless the training is implemented in an encrypted space.

In some implementations, a collaborative model training process may be used. Such collaborative model training process may not require sharing of local datasets and thus help protect private data and reduce the communication inefficiencies associated transporting the training data set from local data sources to a central model training server(s). The central server may be configured to merely coordinate the training process and training rounds among local nodes associated with local data sources to arrive at an optimal global model that can be shared among the local nodes. Such collaborative model training approach may be generally referred to as federated learning.

Figure 1:
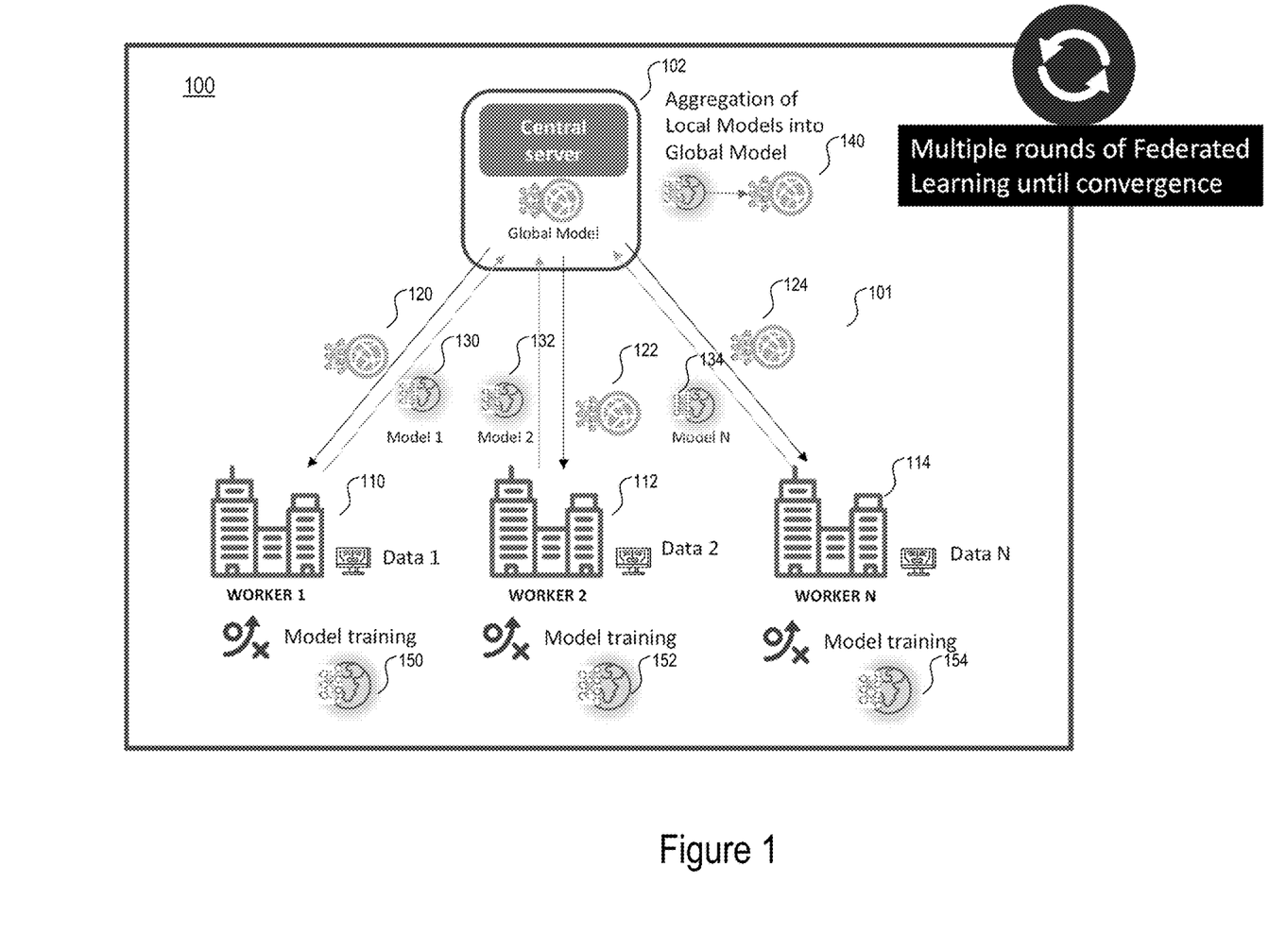
FIG. 1 illustrates an example implementation for a federated learning system.

FIG. 1 illustrate an example federated learning system 100. The federated learning system 100, for example, may include distributed nodes 110, 112, and 114, in communication with a central server or a central server group 102 via communication networks 101. Each of the distributed nodes and the central server or server group may include various computing components at various geographical locations. The central server or server group 102 may themselves be geographically centralized or distributed. For example, the central server of server group may be implemented virtually in a cloud computing platform. The communication networks 101 may include any combination of wireless or wireline network components that are either publicly or privately accessible by the local nodes 110, 112, and 114 and the central server or server group 102 (herein referred to as central server for simplicity).

The central server 102 may be configured to determine initially in any manner an architecture for a global model. As a non-limiting example, the global model may be a deep learning model including one or more neural networks. For example, the one or more neural network model may include a convolutional neural network containing an input layer, an output layer, a plurality of convolutional layers, pooling layers, fully connected layers, and the like. The layers other than the input and output layers may be referred to as hidden layers. Each layer may include a plurality of neurons or convolutional features. The neurons and convolutional features may be interconnected between the various layers. The layer architecture of the global model may be represented by a set of hyper parameters. The hyper parameters may represent the type of layers, the number of layers, the number of neurons and features, the size of the features, and the interconnection between the layers. The neurons, features, connection weights and bias therebetween, and the like constitute the model parameters that are determined via a training process.

Such a global model as determined by the central server 102 but not yet trained may be provided to the plurality of local nodes 110-114, as shown by 120, 122, and 124. In the federated learning system 100, these local nodes may be configured to independently train the global model provided by the central server 102. Each of the local nodes 110-114 may be associated with their local datasets that may be used for the local training of the global model. The local training of the global model may be performed and coordinated by the central server 102 in rounds or generations. After each round of training, the central server 102 may receive the trained models from the local nodes (including trained model parameters or adjustment to model hyper parameters), as shown by 130, 132, and 134. The central server 102 may further aggregate these trained models to derive a new global model, as shown by 140, and communicate the new global mode to the local nodes for the next round of training, as shown by 120, 122, and 124. The term "round" and "generation" are used interchangeably in this disclosure. The goal of the training process, for example, is to obtain a converged global model with optimized global predictive performance at all local nodes.

In each training round, each of the local nodes 110-114 may start with a snapshot of the global model representing an immediate previous round as aggregated by the central server 102 from the local nodes, perform local training using local training datasets to locally update the model parameters e to generate local models 150, 152, and 154, and communicate the updated local training parameters θ to the central server 102, as shown by 130, 132, and 134. In some implementations, the local nodes may also adjust the model architecture (e.g., hyper parameters) of the global model provided by the central server. The central server 102 may then aggregate the updated models in the current training round from the local nodes to generate the new global model (e.g., a set of aggregated and shared model parameters) for distribution to the local nodes for the next round of training, as shown by 140, 120, 122, 124 of FIG. 1. Merely as an example, the aggregation of the updated model parameters may be implemented as a weighted average for each of the updated model parameters of the current training round from the various local nodes.

The various optimization criteria for local training in each round by the local nodes may be determined by the local nodes themselves or may be dictated by the central server 102. Regardless, such optimization criteria may include but are not limited to loss functions and convergence conditions based on the loss functions. The local nodes may iteratively train the model in each round using, for example, gradient decent, to calculate and minimize the loss functions with respect the local training dataset. Each iterative training round ends at a local node when the convergence conditions are met, and the locally updated model parameters for the round are thereafter reported to the central server 102.

Essentially, the local training rounds described above allows for closed model training of a shared model without sharing of local datasets by the local nodes. In each round of training, each local node optimizes the model parameters independently by learning data features and correlations in the local datasets. The aggregation by the central server 102 mixes up the training results among the local nodes and provides the local nodes with a new model which may not meet the convergence conditions at each of the local nodes and may serve as the starting point for a next round of training. The aggregation and multi-round training thus help identify correlation between datasets at different nodes without sharing the datasets. The training rounds end when the aggregated model parameters meet the convergence conditions at each of the local nodes. The resulting model would represent a globally optimized and shared model that may provide optimized predictive performance at all local nodes.

While the example federated learning implementation above help reduce the need for the local nodes to exchange local datasets, thereby solving the data privacy issues, challenges remain in various application circumstances. For example, it does require the local nodes to eventually share the same global architecture and model parameter. In the circumstances where the distributed local datasets are generated by heterogenous devices at local nodes and may thus be statistically heterogeneous at the local nodes, such shared global model may reasonably but may not satisfactorily predict at each and every local node. For another example, while the implementation above avoids communication of the local datasets, it does require communication of the model parameters. In most circumstances, the global model parameter space for communication may still be extremely large even if only parameter deltas rather than the actual full parameter sets may be communicated, thereby still incurring significant amount of communication cost. In addition, because the participating of nodes may grow to an extremely large number, and when there is no selectivity and incentive mechanism as to which local nodes can participate in the federated learning, it is difficult to weed out nodes with poor training performance or nodes with lower data quality and difficult to control the amount of overall communication and associated cost.

Figure 2:
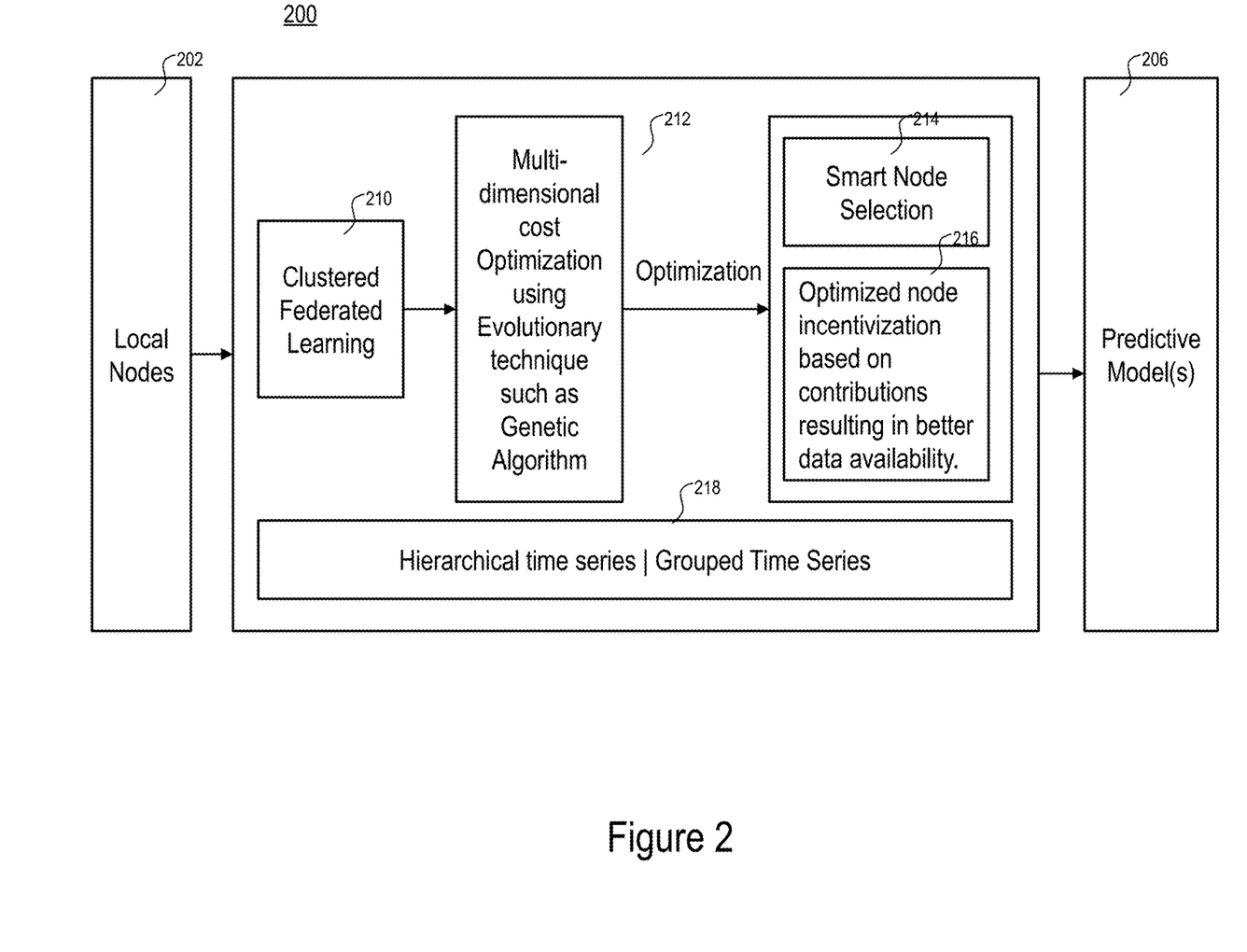
FIG. 2 illustrates another example implementation for federated and collaborative learning using an adaptive and evolutionary approach.

In FIG. 2, another example implementation 200 is illustrated for further improving federated learning and addressing the various concerns above. The example implementation 200 essentially provides more flexibility to the federated learning by leaving some of the model architectural hyper parameter settings and model parameters to local nodes. The term hyper parameters or hyper parameter settings are used to refer architectural level parameters of a model (e.g., number of hidden layers, size of kernels, configuration of neuro connections). As such, not all of these parameters are shared globally and the intermediate and final models trained at each node may not necessarily be the same. For example, they may have different number of hidden layers and each particular layer may have different number of neurons. In such a manner, the number of shared parameters and other information to be communicated to central server may be drastically reduced.

In addition, local nodes may be selectively enlisted and incentivized to participate in the federated learning. An evolutionary approach with a genetic algorithm may be taken to cross over model architectures and other parameters between nodes (cross-over refers to using model architecture form one node on another node), to mutate model architecture and other parameters within each participating node, and to weed out low-performing nodes in each training rounds. In such a manner, the number of nodes participating in the federated learning may be significantly reduced and only the high-quality nodes (quantified in manners detailed below) moves on from training round to training round, thereby further reduce the amount of overall communications. The cross-over process, for example, allows for inter-node correlation identification without data sharing, achieving one of the goals of federated learning.

One of the roles of the central server is to perform node selection, cross-over, and optimization in multiple dimensions including training cost, communication cost, model complexity at the local nodes, model performance, and the like, with further detail provided in the examples below.

The implementation 200 illustrates the various aspects of this example adaptive and multi-dimensionally optimized federated learning. The local nodes 202 provide local training datasets and perform local training of its model having a particular architecture and communicate various architectural hyper parameters to the central server. The central server may be configured to orchestrate the federated learning process. For example, the central server may be configured to perform node selection using clustered federal learning, as shown by 210. In particular, the central server may use non-sensitive data (e.g., hierarchical time series of data) communicated from the local nodes, as shown by 218, to perform clustering of the local nodes into representative buckets, as illustrated by 210. Such buckets may be reflective of inhomogeneity of the local nodes. As described in further detail below, the example federated learning process may be based on such local node clustering. For example, the central server may be configured to choose the local nodes for participating in the federated learning, at least in the initial training round, as shown by 214.

The central server in conjunction with the local nodes may be further configured to use the evolutionary approach in crossing over models between local nodes, mutating within local nodes, and weeding out low-performance nodes during the training rounds to perform optimization in multiple dimensions including but not limited to communication cost, computational cost, model architecture, model complexity, model performance and the like, as shown by 212. In comparison to the implementation of FIG. 1, the central server in the implementation 200 thus actively performs a multi-dimensional optimization. The central server may be further configured to moderate the federated learning such that incentivization for local nodes to use high quality data and to perform high quality training rounds may be considered in the federated learning process, as shown by 216. The final models 206 may then be generated after multiple training rounds with overall optimization in costs, model complexity, and model performance.

In some implementations, the model cross-over may be restricted to the nodes in the same cluster, as their datasets are more alike and thus are more likely to share a same model architecture or same model. Through the cross-over and mutation processes above, the model architectures within a cluster may converge. In some other implementations, cross-over across cluster may be allowed as well. In that situation, model architectures may also converge between clusters in addition to within clusters after multiple rounds or generations of training.

Figure 3:
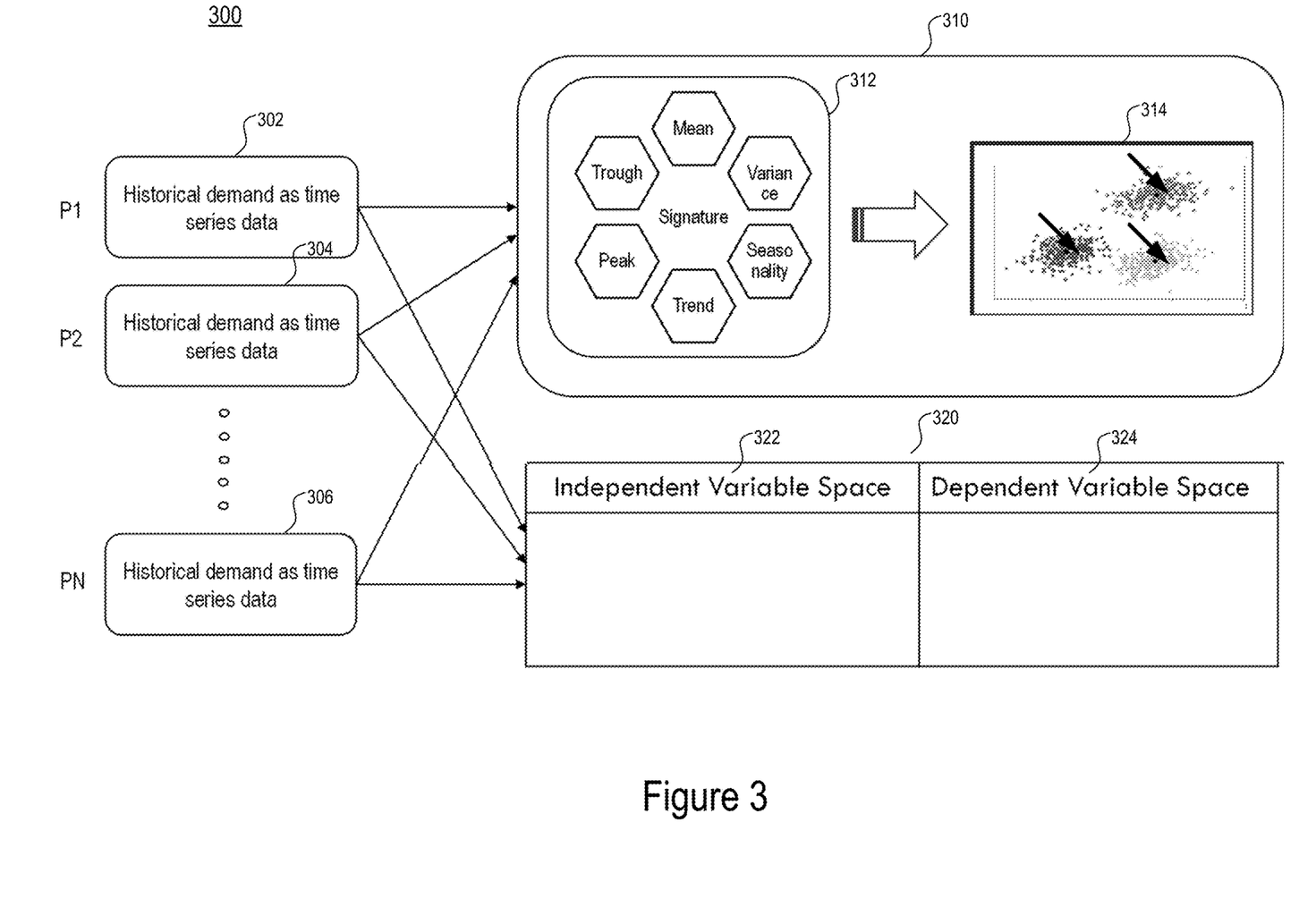
FIG. 3 illustrates an example implementation for clustering local nodes in federated and collaborative learning.

FIG. 3 illustrates the node clustering process 300 as performed by the central server. While the underlying principles described in FIG. 3 and elsewhere in this disclosure apply to a wide range of application, FIG. 3 is illustrated in the context of a particular application involving developing models via federated learning for predicting/forecasting geographical location-dependent energy demand for electricity distribution services.

In this example application scenario, the local nodes may include various local electric distributors at various geographical levels. For example, a local node may be responsible for electric energy distribution for a country, several countries, a region of a country, a city, a town and the like. A node may be referred to as a substation (standing for electric energy supplying substation). Each substation may maintain datasets related to its supply of electric energy to its customers. Some of these datasets may be protected by GDPR and thus may not be shared with other local nodes, wherein some of the datasets may be publicly available and thus sharable.

GDPR protected datasets may include customer information and other private data that relate to the supply of the electric energy (such as historical demand time series 302,

304, and 306 at each node P1, P2, ..., and PN). The sharable datasets, for example, may include statistical measures 312 of the private historical electricity demand time series data 302, 304, and 306 at each node P1, P2, ..., and PN, provided that such statistical measures do not reveal individual private underlying datasets. Such sharable data thus may be communicated from the local nodes to the central server to assist in federated learning. Likewise, for other application circumstances, non-sharable dataset may be kept at the local nodes for local training of the model(s) whereas sharable data may be communicated to the central serval from the local nodes. Alternatively, sharable data may be obtained by the central server from other public data sources. For example, for the electric energy distribution application, the historical demand time series for some example geographic regions may be found at https://data.open-power-system-data.org/time_series.

Example sharable statistical measures 312 of the datasets such as 302-306 may be collected and analyzed by the central server for initial clustering of the local nodes as shown in 310. For example, the datasets 302-306 at each local node, as shown in 320, may be separated into independent variable space 322 containing independent data and dependent variable space 324 containing dependent data. In some implementations, the independent and dependent variables may be used to extract various statistical features and signatures 312. The statistical features 312 may be communicated from the local nodes to the central server and may be used as the various clustering dimensions by the central server. In the electric energy distribution example, various energy demand time series may be extracted by the local nodes into features such as mean, variance, seasonality, trend, peak, trough, and the like of the local electric energy demands.

Various clustering algorithms may be used by the central server to group local nodes into bucket according to the various features/signatures, as shown in 314. In 314, three example clusters are identified. For illustrative purposes, two features/signatures are shown as the clustering dimensions (higher dimensional clustering with more than two features/signatures works under similar principles). Local nodes with like correlation between the features/signatures lump together in 314 (where each point represents a local node). The clustering algorithm may be designed to identify locations of each node in the feature space, determine boundaries between groups of like nodes in the feature space, and treat each of the node group as a cluster. Each of the three example clusters in 314 may represents a group of nodes with statistical heterogeneity. Accordingly, the features and signatures may be developed in a manner that the Local nodes within each resulting cluster are considered relatively homogeneous statistically.

The central server thus may be configured to select representative local nodes from each of the cluster of nodes to participate in the federated learning rather than selecting all the nodes. Such an approach helps reduce computation and communication cost while still generate accurate representative models. For example, the central server may be configured to identify the local nodes near the centroid in the feature space in each cluster as initial representative nodes for the cluster to participate in the federated learning, as shown by the arrows in 314.

Figure 4:
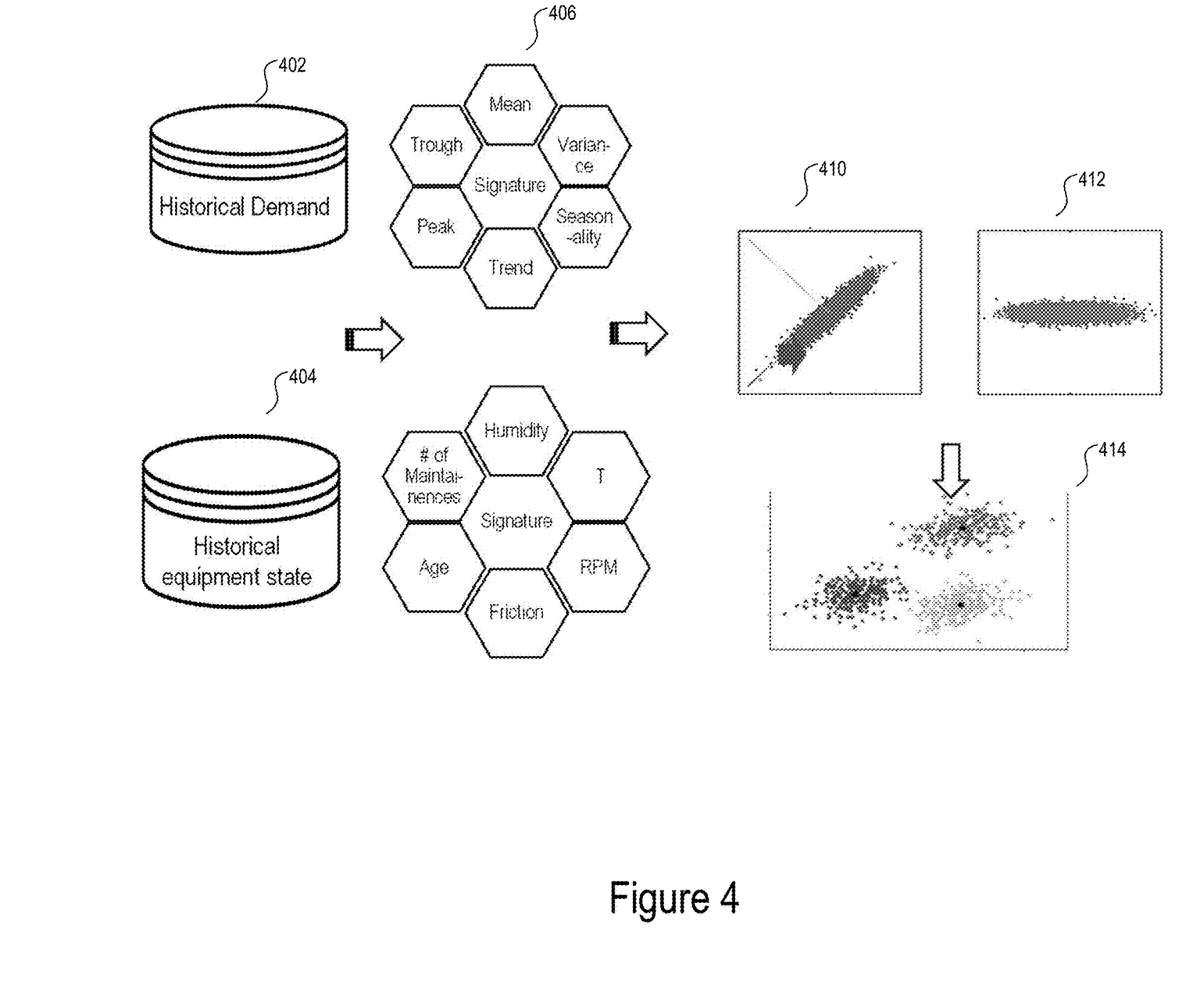
FIG. 4 illustrates another example implementation for clustering local nodes in federated and collaborative learning.

FIG. 4 illustrates another example implementation for local node clustering in the example electric energy distribution application scenario. As shown in FIG. 4, in addition to the energy demand datasets and features shown by 402 and 406, other non-sensitive datasets 404 of the local nodes may also be used to facilitate the clustering process by the central server. Such datasets for example, may include information related to environment and/or electric energy generation equipment data 404. Again, features and signatures may be extracted from these datasets and used for clustering (e.g., shown as temperature, equipment RPM, and equipment friction, age, number of maintenances, and the like). The extraction of features, for example, may involve identifying a feature space with orthogonal features and converting the datasets into these orthogonal feature space, as shown by 410 and 412. These orthogonal features and in combination with the demand features described in 406 and above in relation to FIG. 3 may be used by the central server to establish clustering dimensions to delineate the local nodes into clusters that are relatively homogenous within each cluster but are statistically inhomogeneous between clusters. In some implementations, raw equipment data at the local nodes may be sensitive and subject to GDPR protection. In that case, the feature extraction may be performed by the local nodes and only the resulting feature information that does not reveal details of the underlying raw data may be communicated to the central server.

Figure 5:
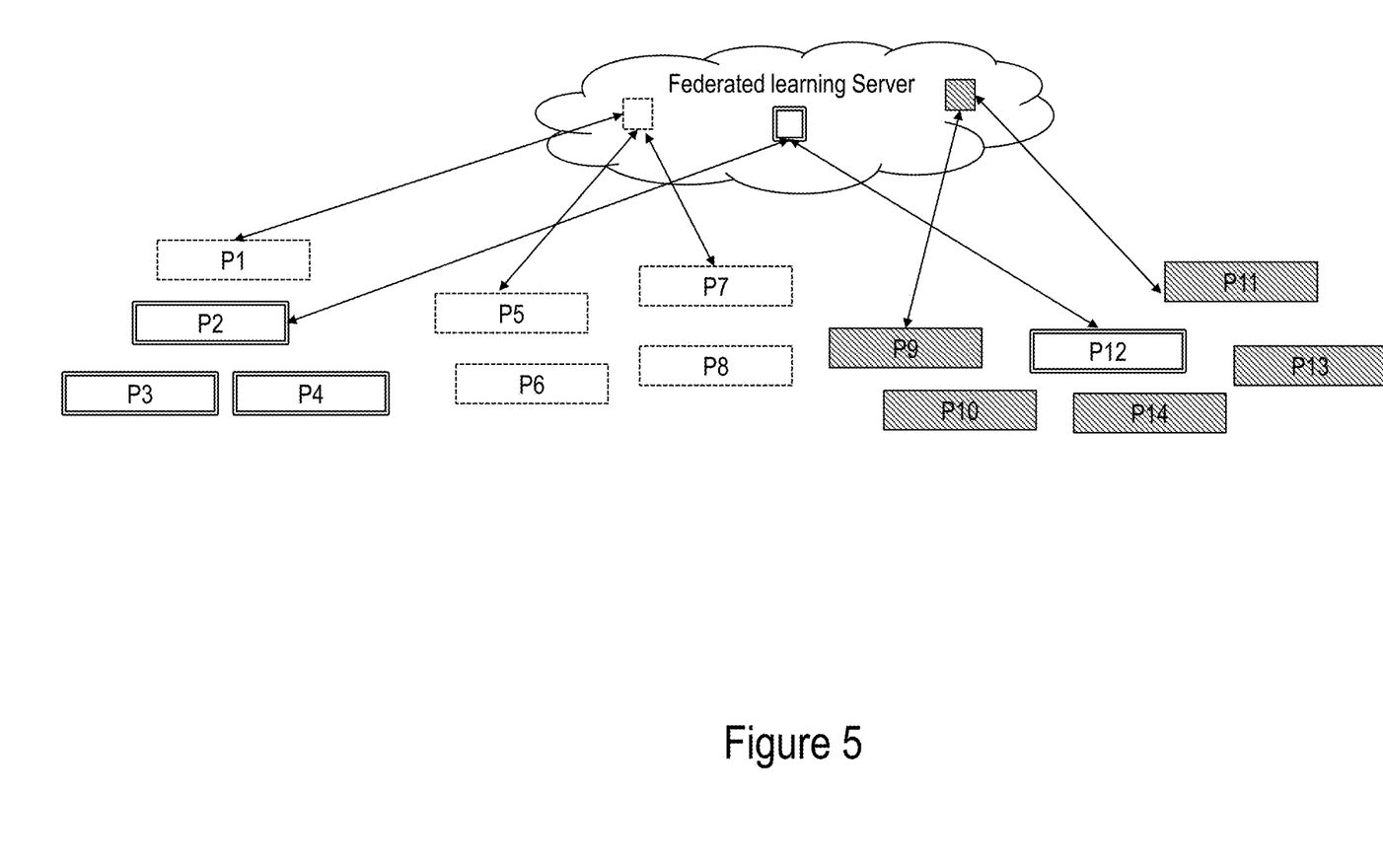
FIG. 5 illustrates an example implementation for selection of representative local nodes for federated and collaborative learning.

FIG. 5 illustrates the initial selection of representative local nodes from each node cluster for participation in the federated learning. In FIG. 5, the example three clusters of local nodes are illustrated as dashed-line boxes, double-line boxes, and filled boxes. For example, the first cluster of nodes (dashed-line boxed) may include local nodes P1, P5-P8; the second cluster of nodes (double-line boxes) may include local nodes P2-P4 and P12; and the third cluster of nodes (filled boxes) may include local nodes P9-P11, P13, and P14. The central server may select one or more initial local nodes from each of the clusters for participating in the federated learning process by, for example, selecting local nodes at or near the centroids of the node clusters in 414 of FIG. 4 or 314 or FIG. 3.

Figure 6:
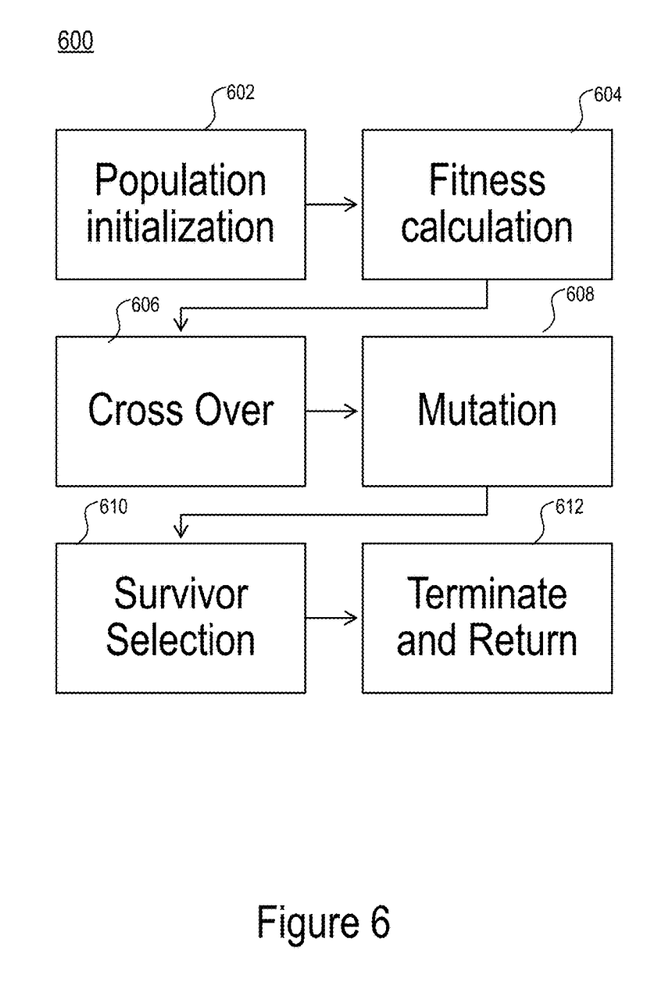
FIG. 6 illustrates an example implementation for applying an evolutionary approach to federated and collaborative learning.

FIG. 6 further illustrates an example adaptive and evolutionary federated learning process 600. The adaptive and evolutionary federated learning process 600 may include initial local node or population selection 602, fitness calculation 604 in each training round, population cross-over process 606 in each training round, mutation process 608 in each training round, survivor local node selection 610 for a next training round, and termination decision 612 for the evolution process. These general processes are described in more detail in the example federated learning example provided below in relation to FIG. 7.

In a particular implementation, the evolutionary or generic algorithm for federate learning may follow the pseudo flow below:

Initialize population (selection of local nodes)
    Determine population fitness
      While (evolution termination criterion is reached) do
        Parent selection
        Crossover with probability $P_c$
        mutation with probability $P_m$
        Decode and fitness calculation
        Survivor selection
      Find best model
    Return best model.

Figure 7:
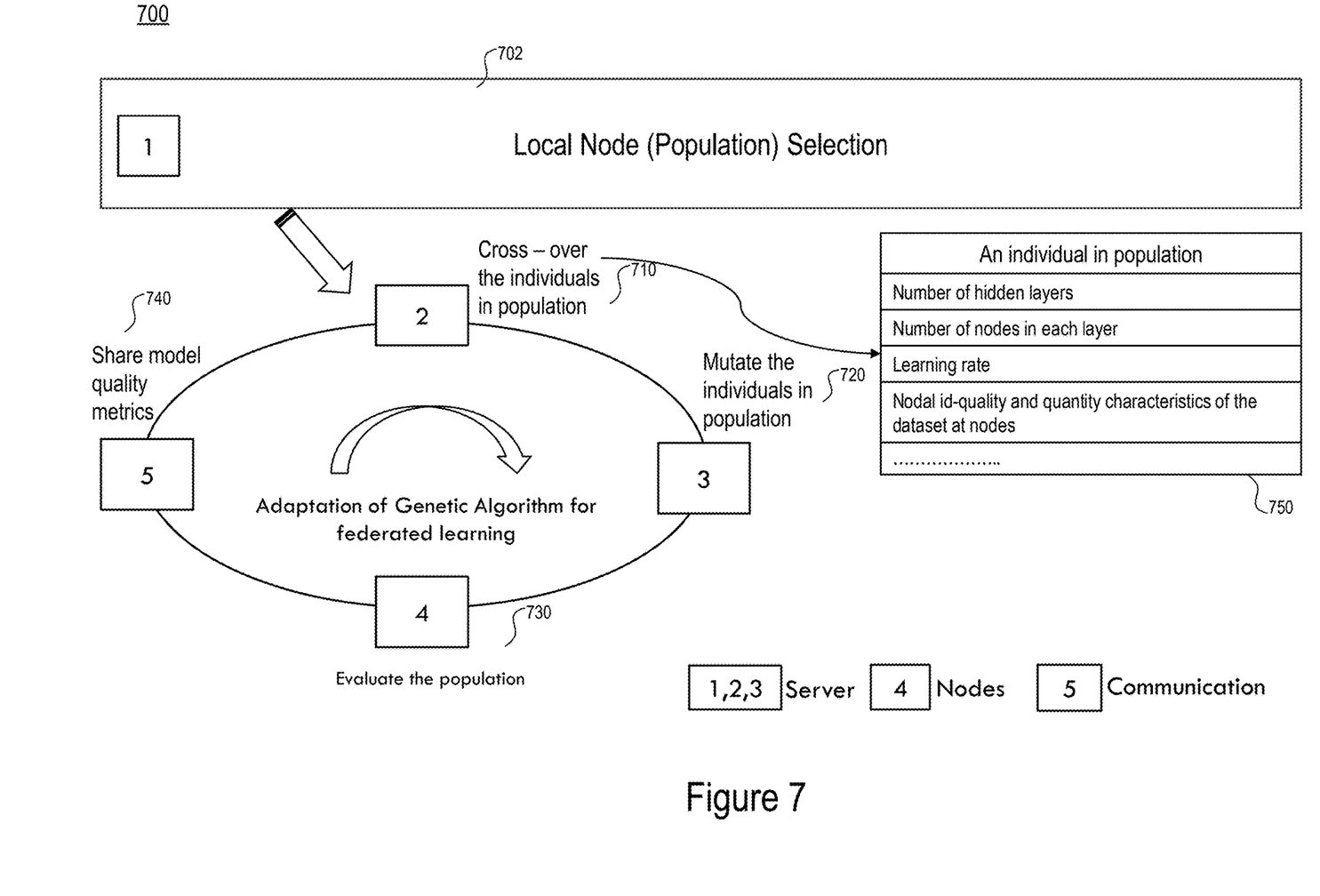
FIG. 7 illustrates an example implementation for adaptive and evolutionary federated and collaborative learning.

FIG. 7 illustrates more detailed implementation 700 of a training round of the example adaptive and evolutionary federated learning process described above. The example federated learning round starts at 702, where local nodes (or population in the language pertaining to evolution) are selected by the central server to enter a current training rounds by these selected local nodes. For an initial round of training, an initial local node selection may be based on, for example, the clustering method described above. For each intermediate rounds of training, the node selection process 702 may involve evaluating each local node participated in a previous round of training and eliminating unfit nodes and retain fit nodes for the current training round.

For a current training round, the server may start by making cross-over decision among the individual local nodes currently selected or retained as participating in the federated learning, as shown by 710. The cross-over may include passing the model architectural parameters and other parameters, as described in more detail below, from one node to another node. As shown in 720, the central server may further make mutation determination for one or more local nodes currently participating in the federated learning. The mutation may involve adjusting model architectural parameters and other parameters in a particular node independent of other local nodes. The local nodes may then proceed with its local training using the model architecture updated via the cross-over and mutation processes and based on the local training datasets until convergence (satisfaction of local training convergence conditions), and generating an evaluation of the resulting model in the current round of training, as shown by 730. Such evaluation may be generated in the form of shared model quality/performance metrics (e.g., mean absolute percentage error, or MAPE) at each of the participating local node and communicated to the central server as shown by 740. Such metrics may be used by the central server for determining fitness of the local nodes and for selection of local nodes for the next round of training, including weeding out or eliminating unfit nodes thereby only retaining the fit local nodes.

In the implementation 700 of FIG. 7, each individual node participating in the adaptive and evolutionary federated learning may train a model having local and sharable model architectural parameters (e.g., hyper parameter), including but not limited to number of hidden layers in the model, number of neurons in each layer, and the connectivity between the layers, as shown in 750. These model architectural parameters may be communicated from one local node to the central servers and relayed to other nodes during cross-over process 710. These parameters further represent the complexity of each individual model at the local nodes (e.g., model complexity may be proportional to the number of layers and number of neurons in the neural network layers). The complexity of the model, in turn, may correlate with training and computational cost at the local nodes. These parameters may be further considered by the central server in node selection process 702 via a multi-dimensional optimization described in further detail below. These parameters may also be considered by the central server in making mutation determination in 720.

Other parameters that may be shared and used in the selection of local nodes, the cross-over decision, and the mutation may include but are not limited to a measure of learning rate at the local nodes and dataset quality measure and characteristics at the local nodes, and size of training data set, percentage of data usage at each node, and the like, as shown by 750. Using such factors in determining, for example, node selection of next round of training, may incentivize local node to use high quality dataset and model construction for model training.

The implementation 700 of FIG. 7 thus achieves a collaborative learning in an adaptive and evolutionary manner. Each node essentially uses its local training dataset to train a model with a set of architectural hyper parameters to obtain converged model parameters. Performance of the models are evaluated by each node. Model architectures are reported to the central server. The central server makes decision on parental relationship between the nodes in cross-over of the model architectures as well as in model mutation, and select the fit nodes to continue to the next round of training. In the next round of training, some of the nodes will start with a new model architecture and train the new model with its local datasets until convergence to obtain updated models at the local nodes. The training rounds continue until termination conditions are met, where the local nodes may converge to the best model architecture(s) overall or in each cluster, which is (are) trained at each of the node using the local datasets.

The node selection 702 by the central server may be made by optimizing a multi-dimensional cost and performance function. An example multi-dimensional cost and performance function may contain components including but not limited to cost associated with data communication between local nodes and the central server, the cost associated with the computation by the local nodes, equivalent cost associated with the complexity of the models at the local nodes (the size of the neural networks, the number of hidden layers, the number of neurons in each neural network layer, equivalent cost associated with the size of training datasets at the local node), performance of the models, and the like. Some of these components of the cost and performance function may be determined by the central server from the reported parameters by the local nodes. Some of these components of the cost and performance function may be evaluated by the local nodes and collected by the central server. Merely as one example, the model complexity evaluation may be measured by averaging the number of weights of the model as communicated from the local node to the central server, which may be correlated with the number of neurons in the model (hence model complexity). For another example, the performance of the models may be measured by its predictive accuracy as determined and reported by each local node. The central server may determine a combined model accuracy at each training round by averaging the accuracies of the models from the local nodes.

In some implementations, the central server may be configured to select/retain sufficient number of local nodes from one round to the next round of training while optimizing the cost and performance function describe above and taking into consideration the clustering of the local nodes (such that sufficient representatives are selected/retained from each node cluster). The training rounds or generations may terminate when the cost/performance function reaches a termination condition (e.g., it reaches a predefined threshold, or it stopped improving).

Table 1 below illustrates example contributions to an example cost/performance function in a first training round in the example energy distribution application scenario.

TABLE 1

| Nodes | # of Layers | # of Neural Cells | Learning Rate | Records % | Comm Cost | Contri | MAPE | Time Taken | Total Cost |
|---|---|---|---|---|---|---|---|---|---|
| 1 | 2 | [6, 7] | 0.001 | 0.49 | 26 | 43.23 | 10.47 | 1.15 | 80.85 |
| 2 | 5 | [3, 7, 5, 6, 5] | 0.001 | 0.60 | 26 | 100.00 | 44.29 | 1.03 | 171.3 |
| 3 | 5 | [5, 6, 4, 5, 3] | 0.01 | 0.61 | 23 | 80.50 | 7.99 | 0.96 | 112.5 |
| 4 | 5 | [6, 3, 7, 4, 5] | 0.000939 | 0.91 | 25 | 60.28 | 8.17 | 1.19 | 94.65 |
| 5 | 4 | [5, 3, 6, 3] | 9.92E−05 | 0.68 | 17 | 97.19 | 71.92 | 0.92 | 187.0 |
| 6 | 4 | [7, 4, 7, 3] | 0.001 | 0.49 | 21 | 70.32 | 30.08 | 0.87 | 122.3 |
| 7 | 2 | [4, 6] | 0.01 | 0.83 | 10 | 42.02 | 5.49 | 0.84 | 58.35 |
| 8 | 2 | [6, 4] | 0.01 | 0.95 | 10 | 21.89 | 4.59 | 0.84 | 37.32 |
| 9 | 4 | [7, 5, 5, 3] | 0.009746 | 0.45 | 20 | 33.01 | 7.87 | 0.86 | 61.74 |
| 10 | 2 | [4, 4] | 0.01 | 0.90 | 8 | 45.20 | 7.17 | 0.85 | 61.22 |
| 11 | 4 | [7, 5, 3, 3] | 0.0001 | 0.58 | 18 | 100.00 | 100.00 | 0.90 | 218.9 |
| 12 | 2 | [6, 6] | 0.01 | 0.94 | 12 | 4.57 | 5.35 | 1.08 | 23.00 |
| 13 | 4 | [6, 3, 5, 7] | 0.0001 | 0.62 | 21 | 100.00 | 100.11 | 0.89 | 222.00 |
| 14 | 3 | [6, 3, 7] | 9.04E−05 | 0.49 | 16 | 100.00 | 90.24 | 0.80 | 207.04 |
| 15 | 3 | [6, 7, 3] | 0.001 | 0.98 | 16 | 60.41 | 5.81 | 0.96 | 83.18 |
| 16 | 5 | [5, 5, 3, 5, 3] | 0.001 | 0.65 | 21 | 62.03 | 6.60 | 0.96 | 90.59 |
| 17 | 4 | [7, 3, 6, 5] | 0.01 | 0.76 | 21 | 21.31 | 4.47 | 0.91 | 47.69 |
| 18 | 3 | [7, 5, 7] | 0.01 | 0.41 | 19 | 4.64 | 6.67 | 0.79 | 31.09 |
| 19 | 5 | [5, 3, 4, 3, 5] | 0.001 | 0.90 | 20 | 67.40 | 5.68 | 1.19 | 94.28 |
| 20 | 5 | [6, 6, 5, 5, 4] | 0.01 | 0.89 | 26 | 22.41 | 5.79 | 1.01 | 55.21 |
| 21 | 4 | [5, 7, 6, 5] | 0.01 | 0.83 | 23 | 5.18 | 12.90 | 1.18 | 42.26 |
| 22 | 2 | [3, 5] | 0.001 | 0.50 | 8 | 100.00 | 42.36 | 0.74 | 151.10 |
| 23 | 3 | [4, 4, 4] | 0.0001 | 0.42 | 12 | 100.00 | 89.49 | 0.77 | 202.26 |
| 24 | 3 | [5, 5, 7] | 0.001 | 1.00 | 17 | 68.89 | 34.67 | 0.95 | 121.51 |
| 25 | 5 | [7, 6, 7, 5, 6] | 0.0001 | 0.65 | 31 | 100.00 | 91.13 | 0.95 | 223.08 |

In Table 1, 25 nodes were selected initially (indicated as nodes 1 to 25). Table I includes, for each local node, number of neural network layers, the number of neural cells in each layer, learning rate in the first round of training, percentage of recorded datasets being used in training (dataset size), communication cost, node contribution to reduction of mean absolute percentage error (MAPE, or model performance and accuracy) ("contri" is used to refer to contribution cost), MAPE, time taken for training, and total cost according to the cost/performance function. In particular, Table 1 shows parameter related to complexity of the model trained at each local node including the number of hidden layers and number of neural cells used for the model. Example parameters that may be used to represent the training cost at each node, as shown in Table I, include data communication cost, time taken for completing the current round of training, contribution cost ("contri" in Table 1), and percentage of local datasets of record used for training. These costs are aggregated into a total cost measure at each node. Example parameters representing the performance of the trained model at each of the local nodes include the learning rate, and MAPE of the model. An example optimization algorithm may be used to reduce the total cost, increase the performance, and reduce the model complexity when performing cross over, mutation, and selection of nodes for next rounds of training.

Table 2 further shows an example evolution of the various cost and performance contributions and the total cost/performance function evolution through training rounds and node selection.

TABLE 2

| Generation/ Rounds | Communication Cost | Contribution Cost | MAPE | Time Taken | Total Cost |
|---|---|---|---|---|---|
| 1 | 17 | 11.52 | 6.80 | 0.96 | 36.27 |
| 2 | 17.4 | 4.22 | 6.93 | 0.99 | 29.54 |
| 3 | 14.4 | 7.77 | 5.72 | 0.96 | 28.86 |
| 4 | 14.4 | 7.66 | 5.78 | 0.92 | 28.76 |

TABLE 2-continued

| Generation/ Rounds | Communication Cost | Contribution Cost | MAPE | Time Taken | Total Cost |
|---|---|---|---|---|---|
| 5 | 14.8 | 4.15 | 7.25 | 0.85 | 27.05 |
| 6 | 14.8 | 4.15 | 7.25 | 0.85 | 27.05 |
| 7 | 13.6 | 4.22 | 7.51 | 0.81 | 26.13 |
| 8 | 11.4 | 3.66 | 6.14 | 0.82 | 22.01 |
| 9 | 10 | 3.81 | 5.99 | 0.81 | 20.61 |
| 10 | 10 | 3.81 | 5.99 | 0.81 | 20.61 |
| 11 | 10 | 3.81 | 5.99 | 0.81 | 20.61 |
| 12 | 10 | 3.77 | 5.94 | 0.86 | 20.56 |
| 13 | 10 | 3.77 | 5.94 | 0.86 | 20.56 |
| 14 | 10 | 3.77 | 5.94 | 0.86 | 20.56 |
| 15 | 10.2 | 3.58 | 5.91 | 0.82 | 20.50 |
| 16 | 10.2 | 3.58 | 5.91 | 0.82 | 20.50 |
| 17 | 10.2 | 3.58 | 5.91 | 0.82 | 20.50 |
| 18 | 10.2 | 3.58 | 5.91 | 0.82 | 20.50 |
| 19 | 10.2 | 3.58 | 5.91 | 0.82 | 20.50 |
| 20 | 10 | 3.57 | 5.93 | 0.86 | 20.36 |
| 21 | 10 | 3.57 | 5.93 | 0.86 | 20.36 |
| 22 | 10 | 3.57 | 5.93 | 0.86 | 20.36 |
| 23 | 10 | 3.57 | 5.93 | 0.86 | 20.36 |
| 24 | 10 | 3.57 | 5.93 | 0.86 | 20.36 |
| 25 | 10 | 3.57 | 5.93 | 0.86 | 20.36 |

Table II shows that the reduction of overall cost/performance function as it converges as a function of generation/rounds.

The adaptive and evolutionary approach to federated learning thus provides at least the following characteristic and advantages. It uses multiple cost function component considerations for an optimization of node-level process parameters and input training datasets, there by provide the capability of Joint optimization of communication cost minimization along with accuracy and computation cost improvisation during training rounds. In addition, it provides smart node selection along with clustered federated learning for further reducing communication cost. Further, it uses a genetic algorithm for adaptive federated learning, thereby providing optimization of parameters for Increased accuracy and for reduction in communication cost. Furthermore, it provides incentivization for local nodes for contribution in federated learning by way of data contribution in terms of quality and quantity, thereby providing better data and less errors resulting in better data availability and model accuracy.

Figure 8:
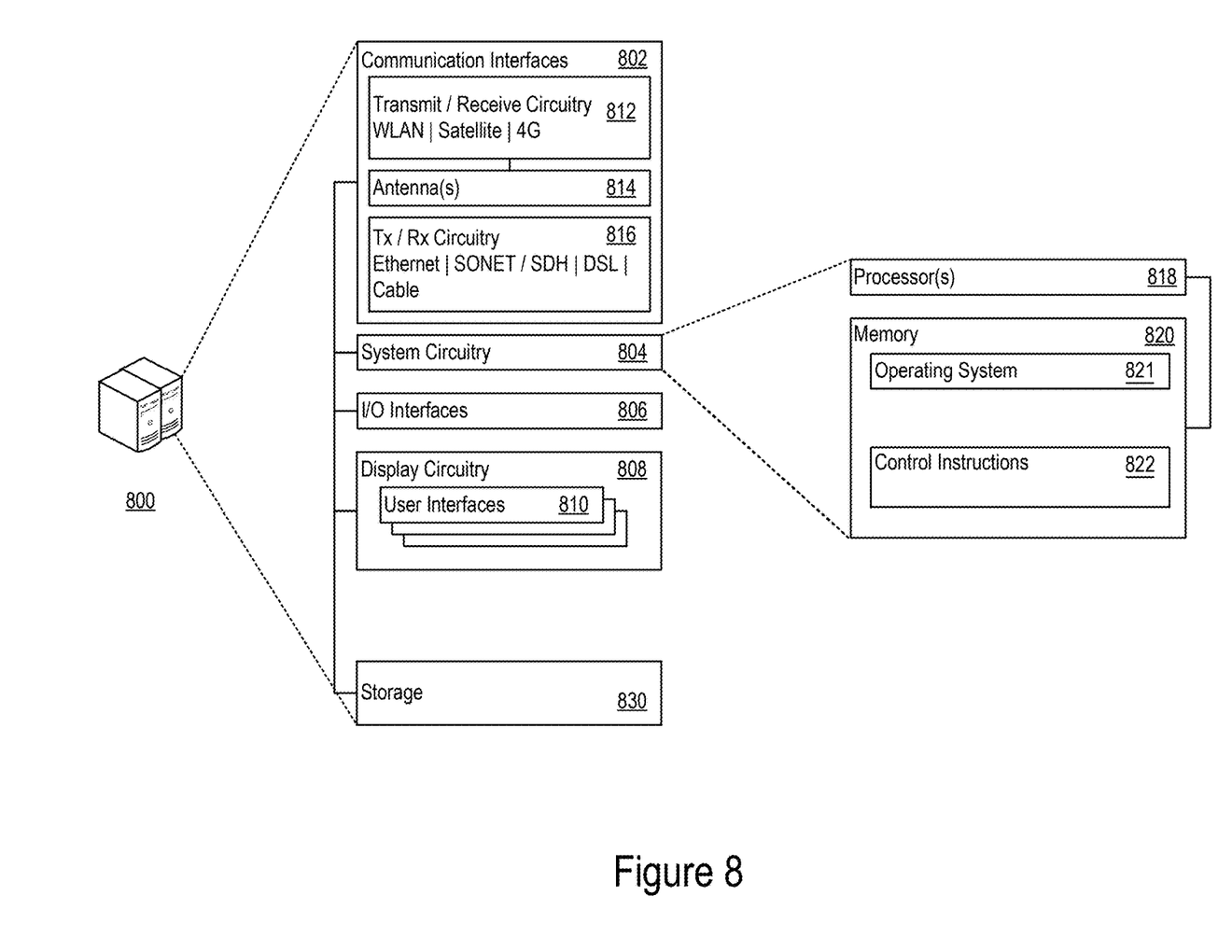
FIG. 8 illustrates an exemplary computing device that may be used to implement various computing components of the systems described.

Finally, FIG. 8 illustrates an exemplary architecture of a computing device 800 on which the various computing components of the system described above. The computing device 800 may include communication interfaces 802, system circuitry 804, input/output (I/O) interface circuitry 806, and display circuitry 808. The graphical user interfaces (GUIs) 810 displayed by the display circuitry 808 may be used to receive user commands/input and to display various outputs. The GUIs 810 may be displayed locally using the display circuitry 808, or for remote visualization, e.g., as HTML, JavaScript, audio, and video output for a web browser running on a local or remote machine.

The GUIs 810 and the I/O interface circuitry 806 may include touch sensitive displays, voice or facial recognition inputs, buttons, switches, speakers and other user interface elements. Additional examples of the I/O interface circuitry 806 includes microphones, video and still image cameras, headset and microphone input/output jacks, Universal Serial Bus (USB) connectors, memory card slots, and other types of inputs. The I/O interface circuitry 806 may further include magnetic or optical media interfaces (e.g., a CDROM or DVD drive), serial and parallel bus interfaces, and keyboard and mouse interfaces.

The communication interfaces 802 may include wireless transmitters and receivers ("transceivers") 812 and any antennas 814 used by the transmit and receive circuitry of the transceivers 812. The transceivers 812 and antennas 814 may support Wi-Fi® wireless local area network (WLAN) communications, for instance, under any version of IEEE 802.11, e.g., 802.11n or 802.11ac, or other wireless protocols such as Bluetooth® short-range wireless communication protocol, Wi-Fi®, WLAN, cellular (4G, LTE/A). The communication interfaces 802 may also include serial interfaces, such as universal serial bus (USB), serial ATA, IEEE 1394, lighting port, I2C, slimBus, or other serial interfaces. The communication interfaces 802 may also include wireline transceivers 816 to support wired communication protocols. The wireline transceivers 816 may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The system circuitry 804 may include any combination of hardware, software, firmware, APIs, and/or other circuitry. The system circuitry 804 may be implemented, for example, with one or more systems on a chip (SoC), application specific integrated circuits (ASIC), microprocessors, discrete analog and digital circuits, and other circuitry. The system circuitry 804 may implement any desired functionality of the disclosed system and its various components. As just one example, the system circuitry 804 may include one or more instruction processor 818 and memory 820.

The memory 820 may be implemented as a non-transitory memory circuit and may store, for example, control instructions 822 for implementing the various functions described above, as well as an operating system 821. In one implementation, the processor 818 executes the control instructions 822 and the operating system 821 to carry out any desired functionality of the adaptive federated learning process above.

The computing device 800 may further include various data sources 830, or may be in communication with external data sources. Each of the databases that are included in the data sources 830 may be accessed by the various component of the disclosed system and its components.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

Many other modifications of the implementations above may be made to adapt a particular situation or material to the teachings without departing from the scope of the current disclosure. Therefore, it is intended that the present methods and systems not be limited to the particular embodiments disclosed, but that the disclosed methods and systems include all embodiments falling within the scope of the appended claims.

We claim:

1. A system comprising:
   memory circuitry for storing computer instructions;
   a network interface circuitry; and
   processor circuitry in communication with the network interface circuitry and the memory circuitry, the processor circuitry configured to execute the computer instructions to:
      receive sharable data from a plurality of local computation nodes;
         cluster the plurality of local computation nodes into a plurality of clusters based on a set of clustering features extracted from the sharable data;
      select a subset of local computation nodes from the plurality of local computation nodes as representatives of the plurality of clusters to participate in a collaborative machine learning; and
      iteratively provision the collaborative machine learning by the subset of the local computation nodes until a termination condition is met by:
         receipt, from the subset of local computation node, sets of model hyper parameters and sets of model metrics associated with machine learning models trained at the subset of local computation nodes using non-sharable datasets of the subset of local computation nodes;
         performance of at least one model architectural hyper parameter cross-over of the machine learning models among the subset of local computation nodes to update the sets of model hyper parameters for the subset of local computing nodes, wherein the performance of the at least one model architectural hyper parameter cross-over of the machine learning models among the subset of local computation nodes is limited to intra-cluster cross-over;

elimination of selected local computation nodes of the subset of local computation nodes to obtain a remaining subset of local computation nodes using a multi-dimensional cost/performance function; and instruction of the remaining subset of local computation nodes to perform a next round of training using the non-sharable datasets based on the updated sets of model hyper parameters.

2. The system of claim 1, wherein the non-sharable data from the plurality of local computation nodes comprises a historical time series.

3. The system of claim 2, wherein the set of clustering features comprise at least one of a mean, a trough, a variance, a trend, a peak, or a seasonality extracted from the historical time series by the plurality of local computation nodes.

4. The system of claim 1, wherein to select the subset of local computation nodes as the representatives of the plurality of clusters to participate in the collaborative machine learning comprises selection, by the processor circuitry, of local computation nodes at or near centroids of the plurality of clusters in a clustering space formed by the set of clustering features.

5. The system of claim 1, wherein to iteratively provision the collaborative machine learning further comprises performance, by the processor circuitry, of mutation of the set-sets of model hyper parameters with respect to at least one of the subset of local computation nodes.

6. The system of claim 5, wherein the mutation comprises modification, by the processor circuitry, of at least one of the sets of model hyper parameters.

7. The system of claim 1, wherein the multi-dimensional cost/performance function comprises at least one of a cost component, a performance component, or a local dataset quality component.

8. The system of claim 7, wherein the cost component comprises at least one of a communication cost between the subset of local computing nodes and the system or a computation cost at the subset of local computing nodes.

9. The system of claim 8, wherein the computation cost is determined by a complexity of the machine learning models trained at the subset of local computation nodes.

10. The system of claim 9, wherein the complexity of the machine learning models is computed based at least one of a number of model layers, a number of model elements in each model layer of the machine learning models trained at the subset of local computation nodes.

11. The system of claim 7, wherein the performance component comprises a mean absolute percentage error (MAPE) of the machine learning models.

12. The system of claim 7, wherein the local dataset quality component comprises at least one of a time take-taken or a learning rate for training the machine learning models at the subset of local computation nodes.

13. The system of claim 1, wherein the sets of model hyper parameters comprise parameters representing architectures of the machine learning models.

14. The system of claim 1, wherein to cluster the plurality of local computation nodes into the plurality of clusters, the processor circuitry is configured to:
identify a feature space with orthogonal features;
convert the sharable data into the orthogonal feature space; and
establish clustering dimensions using the orthogonal feature space to delineate the local computation nodes into the plurality of clusters.

15. A method for adaptive federated machine learning performed by a computer server, comprising:
receiving sharable data from a plurality of local computation nodes;
clustering the plurality of local computation nodes into a plurality of clusters based on a set of clustering features extracted from the sharable data;
selecting a subset of local computation nodes from the plurality of local computation nodes as representatives of the plurality of clusters to participate in a collaborative machine learning; and
iteratively provisioning the collaborative machine learning until a termination condition is met by:
receiving, from the subset of local computation node, sets of model hyper parameters and sets of model metrics associated with machine learning models trained by the subset of local computation nodes using non-sharable datasets of the subset of local computation nodes;
performing at least one model architectural hyper parameter cross-over of the machine learning models among the subset of local computation nodes to update the sets of model hyper parameters for the subset of local computing nodes, wherein performing the at least one model architectural hyper parameter cross-over of the machine learning models among the subset of local computation nodes is limited to intra-cluster cross-over;
performing an elimination of selected local computation nodes of the subset of local computation nodes to obtain a remaining subset of local computation nodes using a multi-dimensional cost/performance function; and
instructing the remaining subset of local computation nodes to perform a next round of training using the non-sharable datasets based on the updated sets of model hyper parameters.

16. The method of claim 15, wherein selecting the subset of local computation nodes as the representatives of the plurality of clusters to participate in the collaborative machine learning comprises selecting local computation nodes at or near centroids of the plurality of clusters in a clustering space formed by the set of clustering features.

17. The method of claim 15, wherein iteratively provisioning the collaborative machine learning further comprises performing mutation of the sets of model hyper parameters with respect to at least one of the subset of local computation nodes.

18. The method of claim 15, wherein the multi-dimensional cost/performance function comprises at least one of a cost component, a performance component, or a local dataset quality component.

19. The method of claim 18, wherein:
the cost component comprises at least one of a communication cost between the subset of local computing nodes and a system or a computation cost at the subset of local computing nodes;
the performance component comprises a mean absolute percentage error (MAPE) of the machine learning models; and
the local dataset quality component comprises at least one of a time taken or a learning rate for training the machine learning models at the subset of local computation nodes.

20. The method of claim 15, wherein clustering the plurality of local computation nodes into the plurality of clusters comprises:

identifying a feature space with orthogonal features;
converting the sharable data into the orthogonal feature space; and
establishing clustering dimensions using the orthogonal feature space to delineate the local computation nodes into the plurality of clusters.

* * * * *